(12) United States Patent
Bremser et al.

(10) Patent No.: US 7,488,769 B2
(45) Date of Patent: Feb. 10, 2009

(54) AQUEOUS DISPERSION OF INORGANIC NANOPARTICLES, METHOD FOR THE PRODUCTION AND USE THEREOF

(75) Inventors: Wolfgang Bremser, Münster (DE); Wilfried Stübbe, Greven (DE); Elke Westhoff, Steinfurt (DE); Manuela Niemeier, Dremsteinfurt (DE); Andreas Poppe, Münster (DE)

(73) Assignee: BASF Coatings AG, Munster (DE)

( * ) Notice: Subject to any disclaimer, the term of this patent is extended or adjusted under 35 U.S.C. 154(b) by 487 days.

(21) Appl. No.: 10/510,997

(22) PCT Filed: May 2, 2003

(86) PCT No.: PCT/EP03/04646

§ 371 (c)(1),
(2), (4) Date: Oct. 12, 2004

(87) PCT Pub. No.: WO03/095532

PCT Pub. Date: Nov. 20, 2003

(65) Prior Publication Data

US 2005/0159523 A1  Jul. 21, 2005

(30) Foreign Application Priority Data

May 11, 2002 (DE) ................. 102 21 010

(51) Int. Cl.
*C08K 5/05* (2006.01)
(52) U.S. Cl. ............... 524/384; 524/386; 524/430; 524/431
(58) Field of Classification Search ........... 524/384, 524/386, 430, 431
See application file for complete search history.

(56) References Cited

U.S. PATENT DOCUMENTS

| | | | |
|---|---|---|---|
| 3,069,375 A | | 12/1962 | Bullitt et al. |
| 5,118,727 A | * | 6/1992 | Roberts et al. ............. 523/216 |
| 5,246,624 A | | 9/1993 | Miller et al. |
| 5,853,809 A | | 12/1998 | Campbell et al. |
| 5,916,635 A | * | 6/1999 | Ishii et al. ............... 427/388.2 |
| 6,022,919 A | * | 2/2000 | Komoto et al. ............ 524/430 |
| 6,261,645 B1 | | 7/2001 | Betz et al. |
| 6,419,989 B1 | | 7/2002 | Betz et al. |
| 6,565,978 B1 | * | 5/2003 | Pagac et al. .............. 428/423.1 |
| 6,589,324 B2 | * | 7/2003 | Kamo et al. ............. 106/14.12 |
| 6,599,631 B2 | * | 7/2003 | Kambe et al. ............... 428/447 |
| 6,620,514 B1 | | 9/2003 | Arpac et al. |
| 6,632,897 B1 | | 10/2003 | Geiter et al. |
| 2002/0099119 A1 | * | 7/2002 | Craig et al. ................. 524/265 |
| 2003/0125460 A1 | | 7/2003 | Kato et al. |
| 2004/0059053 A1 | | 3/2004 | Bremser et al. |
| 2004/0132902 A1 | | 7/2004 | Bremser et al. |
| 2005/0182169 A1 | * | 8/2005 | Stubbe et al. ............... 524/379 |
| 2005/0233147 A1 | * | 10/2005 | Niemeier et al. ......... 428/411.1 |

FOREIGN PATENT DOCUMENTS

| | | |
|---|---|---|
| DE | 3828098 | 3/1990 |
| DE | 3836815 | 7/1990 |
| DE | 19910876 | 10/2000 |
| EP | 365027 | 4/1990 |
| EP | 450624 | 10/1991 |
| WO | WO9712945 | 4/1997 |
| WO | WO9716479 | 5/1997 |
| WO | WO9952964 | 10/1999 |
| WO | WO0153107 | 7/2001 |
| WO | WO02055186 | 7/2002 |
| WO | WO03/095567 | 11/2003 |
| WO | WO03095571 | 11/2003 |

OTHER PUBLICATIONS

Abstract for DE3836815 from EPO, Jul. 26, 1990.
Abstract for EP365027 from EPO, Apr. 25, 1990.
U.S. Appl. No. 09/914,545, filed Aug. 30, 2001, Betz et al.
U.S. Appl. No. 10/009,394, filed Oct. 25, 2001, Allard et al.
Abstract for DE19910876 from EPO, Oct. 5, 2000.
Abstract for DE3828098 from EPO, Mar. 8, 1990.
Abstract for EP450625 from EPO, Oct. 9, 1991.
U.S. Appl. No. 10/018,352, filed Dec. 7, 2001, Bremser.
U.S. Appl. No. 10/483,698, filed Jan. 13, 2004, Meisenburg et al.

* cited by examiner

*Primary Examiner*—Bernard Lipman

(57) ABSTRACT

An aqueous dispersion with a pH of from 2 to 7, comprising
(A) at least one swellable polymer or oligomer containing anionic and/or potentially anionic functional groups,
(B) surface-modified, cationically stabilized, inorganic nanoparticles of at least one kind, and
(C) at least one amphiphile;
and its use for producing highly scratch-resistant coatings, moldings, and self-supporting films.

25 Claims, No Drawings

AQUEOUS DISPERSION OF INORGANIC NANOPARTICLES, METHOD FOR THE PRODUCTION AND USE THEREOF

CROSS REFERENCE TO RELATED APPLICATIONS

This application is a National Phase Application of Patent Application PCT/EP03/04646 filed 2 May 2003, which claims priority to DE 102 21 010.1, filed on 11 May 2002.

FIELD OF THE INVENTION

The present invention relates to a novel aqueous dispersion of inorganic nanoparticles. The present invention also relates to a novel process for preparing aqueous dispersions of inorganic nanoparticles. The present invention further relates to the use of the novel aqueous dispersion of inorganic nanoparticles for producing coatings and paint systems and also moldings, especially optical moldings, and self-supporting films.

STATE OF THE ART

Aqueous dispersions of inorganic nanoparticles with their surface modified with at least one compound of the general formula II:

(II)

in which the indices and variables have the following meanings:
S is a reactive functional group;
L is an at least divalent organic linking group;
H is a hydrolyzable monovalent group or a hydrolyzable atom;
M is a divalent to hexavalent main group or transition group metal;
R is a monovalent organic radical;
o is an integer from 1 to 5;
m+n+p is an integer from 2 to 6;
p is an integer from 1 to 6, and
m and n are zero or an integer from 1 to 5 are known from international patent application WO 99/52964. They are prepared by coating inorganic nanoparticles with the compounds II in aqueous dispersion, and then distillatively removing the alcohols formed by the hydrolysis and condensation.

The known aqueous dispersions of surface-modified inorganic nanoparticles may be used as coating materials for producing transparent, scratch-resistant coatings.

These known coatings are of high transparency and good adhesion to a large number of substrates. However, they are comparatively brittle and cannot be produced in coat thicknesses >30 μm, since stress cracks then occur. Moreover, the known coatings undergo delamination comparatively readily following exposure to water.

European patent application EP 0 832 947 A2 discloses clearcoat materials comprising inorganic nanoparticles whose surface has been modified such that it is able to react with the binder. The scratch resistance of the clearcoats produced from these clearcoat materials does not, however, match that of the coatings known from international patent application WO 99/52964. Moreover, the clearcoat materials of the European patent application include large amounts of organic solvents, and so give off large amounts of volatile organic compounds (VOCs) on application and curing, which is economically and environmentally disadvantageous.

German patent application DE 101 26 651.0, unpublished at the priority date of the present specification, describes coating materials which comprise
(A) at least one binder selected from the group consisting of random, alternating, and block, linear, branched, and comb, polyaddition resins, polycondensation resins, and addition (co)polymers of olefinically unsaturated monomers, curable physically, thermally, with actinic radiation, and both thermally and with actinic radiation; and
(B) nanoparticles selected from the group consisting of nanoparticles that have been modified with at least one compound of the general formula (II):

(II)

in which the indices and variables have the following meanings:
S is a reactive functional group containing at least one bond which can be activated with actinic radiation;
L is an at least divalent organic linking group;
X independently at each occurrence is an oxygen atom, sulfur atom or >NR$^6$, where R$^6$=hydrogen atom or alkyl group having from 1 to 4 carbon atoms;
M is a metal atom;
R is a monovalent organic radical;
o is an integer from 1 to 5;
m is 3 or 4;
n is 1 or 2 if m=3 and
n is 1, 2 or 3 if m=4.

The coating materials may comprise (meth)acrylate copolymers as binders. Besides numerous other monomers, the (meth)acrylate copolymers may also contain, in copolymerized form, monomers (b) of the general formula I:

(I)

in which the radicals R$^1$, R$^2$, R$^3$, and R$^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables R$^1$, R$^2$, R$^3$, and R$^4$ are substituted or unsubstituted aryl, arylalkyl or arylcycloalkyl radicals, especially substituted or unsubstituted aryl radicals.

The coating materials may be conventional systems comprising organic solvents, aqueous systems, substantially or entirely solvent- and water-free liquid coating materials (100% systems), substantially or entirely solvent- and water-free solid coating materials (powder coating materials), or substantially or entirely solvent-free powder coating suspensions (powder slurries). The examples, however, describe only a conventional clearcoat material comprising organic solvents. Moreover, the electrophoretic mobility of the binders in an aqueous dispersion with a pH of from 2 to 7 is not specified.

German patent application DE 101 15 592.1, unpublished at the priority date of the present specification, describes aqueous dispersions which are free or substantially free from volatile organic compounds and comprise
(A) at least one copolymer preparable by two-stage or multistage free-radical copolymerization in an aqueous medium of
a) at least one olefinically unsaturated monomer selected from the group consisting of hydrophilic and hydrophobic olefinically unsaturated monomers and b) at least one non-(a) olefinically unsaturated monomer of the general formula (I)

$$R^1R^2C=CR^3R^4 \qquad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals; and (B) hydrophilic nanoparticles.

The surface of the hydrophilic nanoparticles, however, is unmodified.

PROBLEM OF THE PRESENT INVENTION

It is an object of the present invention to provide novel aqueous dispersions of surface-modified inorganic nanoparticles which no longer have the disadvantages of the state of the art but instead are stable on storage and give coatings and paint systems, and also optical moldings and self-supporting films, which are highly scratch resistant, of high gloss, flexible, transparent, and clear, the coatings and the paint systems no longer exhibiting any stress cracks at coat thicknesses>30 μm or any delamination from the substrates.

A particular object of the present invention was to provide novel aqueous dispersions which have a high nanoparticle content.

THE SOLUTION ACCORDING TO THE INVENTION

The invention accordingly provides the novel aqueous dispersion with a pH of from 2 to 7, comprising (A) at least one swellable polymer or oligomer containing anionic and/or potentially anionic and/or nonionic hydrophilic groups, (B) surface-modified, cationically stabilized, inorganic nanoparticles of at least one kind, and (C) at least one amphiphile, and referred to below as "dispersion of the invention".

Further subject matter of the invention will emerge from the description.

In the light of the state of the art it was surprising and unforeseeable for the skilled worker that the object on which the present invention was based could be achieved by means of the dispersion of the invention.

Since a positive surface charge is essential for a series of aqueous dispersions of inorganic nanoparticles (examples being boehmite and certain silica sols), it was all the more suprising that a combination of cationically stabilized, surface-modified, inorganic nanoparticles with anionically stabilized polymers and oligomers leads to storage-stable aqueous dispersions. More surprising still was that this was achievable by means of copolymers which were readily swellable in aqueous media with a pH of from 2 to 7 and which therefore exhibited good electrophoretic mobility. A particular surprise was that the dispersions of the invention had a particularly high nanoparticle content.

DETAILED DESCRIPTION OF THE INVENTION

The dispersion of the invention has a pH of from 2 to 7, preferably from 2.5 to 7 and in particular from 3 to 6.5. The pH is adjusted by adding organic and/or inorganic acids which do not undergo any unwanted reactions with the starting products and with the constituents of the dispersion of the invention, such as precipitation reactions or the decomposition of nanoparticles (B). Examples of suitable acids are formic, acetic, and hydrochloric acid.

The solids content of the dispersion of the invention may vary very widely and is guided by the requirements of the case in hand. It is preferably from 10 to 80%, more preferably from 15 to 75%, with particular preference from 20 to 70%, with very particular preference from 25 to 65%, and in particular from 30 to 60% by weight, based in each case on the total amount of the dispersion of the invention.

The first essential constituent of the dispersion of the invention is at least one, especially one, swellable polymer or oligomer (A), particularly a polymer (A), containing anionic and/or potentially anionic functional groups.

Here and below, polymers are compounds which contain on average more than 10 monomer units in the molecule. Oligomers are compounds which contain on average from 2 to 15 monomer units in the molecule. For further details of this, refer to Römpp Lexikon Lacke und Druckfarben, Georg Thieme Verlag, Stuttgart, New York, 1998, page 425, "oligomers", and page 464, "polymers".

The anionic and potentially anionic functional groups are preferably selected from the group consisting of carboxylic, sulfonic, and phosphonic acid groups, acidic sulfuric and phosphoric ester groups, and carboxylate, sulfonate, phosphonate, sulfate ester, and phosphate ester groups, especially carboxylic acid and carboxylate groups.

The amount of anionic and/or potentially anionic functional groups in the polymers and oligomers (A) may vary very widely and is guided by the requirements of the case in hand, particularly by the amount of these groups that is necessary in order to ensure the swellability of the polymers and oligomers (A) in aqueous media with a pH of from 2 to 7. The amount corresponds preferably to an acid number of from 5 to 70, more preferably from 6 to 60, with particular preference from 7 to 50, with very particular preference from 8 to 40, and in particular from 9 to 30 mg KOH/g. Solids here and below are the sum of the constituents which form the coatings, optical moldings, and self-supporting films produced from the dispersion of the invention.

At pH values of from 2 to 7 the swellable polymers and oligomers (A) preferably have an electrophoretic mobility ≦−0.5, more preferably ≦−2.0 (μm/s)/(V/cm). The electrophoretic mobility can be determined with the aid of laser Doppler electrophoresis. The Zetasizer® 3000 from Malvern can be employed as the measuring instrument. However, microelectrophoretic (microscopic) measurement techniques are also suitable.

The polymers and oligomers (A) are preferably selected from the group of copolymers obtainable by two-stage or multistage controlled free-radical copolymerization in an aqueous or an organic medium, particularly in an aqueous medium, where (1) in a first stage
 (a) at least one olefinically unsaturated monomer, in particular at least one monomer containing at least one, especially one, anionic and/or potentially anionic and/or nonionic hydrophilic functional group in the molecule and
 (b) at least one non-(a) olefinically unsaturated monomer of the general formula (I)

$$R^1R^2C=CR^3R^4 \qquad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals;

are copolymerized and then (2) in a second stage at least one further monomer (a), preferably at least one monomer (a) containing no anionic and/or potentially anionic and/or nonionic hydrophilic functional groups, is (co)polymerized in the presence of the copolymer formed in the first stage, following the addition of small amounts, or without the addition, of free-radical initiators.

Examples of highly suitable monomers (a) containing the above-described anionic and/or potentially anionic functional groups are acrylic acid, beta-carboxyethyl acrylate, methacrylic acid, ethacrylic acid, crotonic acid, maleic acid, fumaric acid or itaconic acid; olefinically unsaturated sulfonic or phosphonic acids or their partial esters; or mono (meth)acryloyloxyethyl maleate, succinate or phthalate, especially acrylic acid and methacrylic acid.

Besides the above-described monomers (a) containing anionic and/or potentially anionic functional groups, or instead of them, it is also possible to use hydrophilic monomers (a) which contain nonionic hydrophilic groups. Preferred hydrophilic groups are polyethylene oxide groups, preferably oligomeric polyethylene oxide groups up a molecular weight of 400 daltons. The amount of such groups in the copolymers (A) may vary very widely and is preferably in accordance with the amount of the anionic and/or potentially anionic groups that is present.

Examples of highly suitable hydrophilic monomers (a) containing functional groups of this kind are omega-hydroxy- or omega-methoxy-polyethylene oxide-1-yl, omega-methoxy-polypropylene oxide-1-yl or omega-methoxy-poly(ethylene oxide-co-polypropylene oxide)-1-yl acrylate or methacrylate.

Furthermore, it is possible as well to use monomers (a) which contain no potentially anionic and/or anionic groups and no nonionic hydrophilic groups. These monomers (a) may be hydrophobic.

Regarding the terms "hydrophilic" and "hydrophobic", refer to Römpp Lexikon Lacke und Druckfarben, Georg Thieme Verlag, Stuttgart, New York, 1998, page 294, "hydrophilicity" and pages 294 and 295, "hydrophobicity".

Examples of suitable olefinically unsaturated monomers (a) of this kind are (1) esters of olefinically unsaturated acids, said esters being substantially free of acid groups, such as (meth)acrylic, crotonic, ethacrylic, vinylphosphonic or vinylsulfonic alkyl or cycloalkyl esters having up to 20 carbon atoms in the alkyl radical, especially methyl, ethyl, propyl, n-butyl, sec-butyl, tert-butyl, hexyl, ethylhexyl, stearyl, and lauryl acrylate, meth-acrylate, crotonate, ethacrylate or vinylphosphonate or vinylsulfonate; cycloaliphatic (meth) acrylic, crotonic, ethacrylic, vinylphosphonic or vinylsulfonic esters, especially cyclohexyl, isobornyl, dicyclopentadienyl, octahydro-4,7-methano-1H-indenemethanol or tert-butylcyclohexyl (meth)acrylate, crotonate, ethacrylate, vinylphosphonate or vinylsulfonate. In minor amounts, these monomers may include more highly functional alkyl or cycloalkyl esters of (meth)acrylic acid, crotonic acid or ethacrylic acid, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane tri(meth)acrylate; or pentaerythritol tetra (meth)acrylate, and the analogous ethacrylates or crotonates. In the context of the present invention, minor amounts of more highly functional monomers (1) are amounts which do not lead to crosslinking or gelling of the copolymers (A), unless they are intended to be in the form of crosslinked microgel particles;

(2) monomers which carry at least one hydroxyl group or hydroxymethylamino group per molecule and are substantially free of acid groups, such as hydroxyalkyl esters of alpha,beta-olefinically unsaturated carboxylic acids, such as hydroxyalkyl esters of acrylic acid, methacrylic acid and ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1,4-bis(hydroxymethyl)cyclohexane, octahydro-4,7-methano-1H-indenedimethanol or methylpropanediol monoacrylate, monomethacrylate, monoethacrylate or monocrotonate; or reaction products of cyclic esters, such as epsilon-caprolactone, and these hydroxyalkyl esters;

olefinically unsaturated alcohols such as allyl alcohol;

allyl ethers of polyols, such as trimethylolpropane monoallyl ether or pentaerythritol monoallyl, diallyl or triallyl ether. The monomers (2) of higher functionality are generally used only in minor amounts. In the context of the present invention, minor amounts of more highly functional monomers are those amounts which do not lead to crosslinking or gelling of the block copolymers (A), unless they are intended to be in the form of crosslinked microgel particles;

reaction products of alpha,beta-olefinically unsaturated carboxylic acids with glycidyl esters of an alpha-branched monocarboxylic acid having from 5 to 18 carbon atoms in the molecule. The reaction of acrylic or methacrylic acid with the glycidyl ester of a carboxylic acid having a tertiary alpha carbon atom may take place before, during or after the polymerization reaction. As component (a1) it is preferred to use the reaction product of acrylic acid and/or methacrylic acid with the glycidyl ester of Versatic® acid. This glycidyl ester is available commercially under the name Cardura® E10. For further details, refer to Römpp Lexikon Lacke und Druckfarben, Georg Thieme Verlag, Stuttgart, New York, 1998, pages 605 and 606;

formaldehyde adducts of aminoalkyl esters of alpha,beta-olefinically unsaturated carboxylic acids and of alpha, beta-unsaturated carboxamides, such as N-methylol- and N,N-dimethylolaminoethyl acrylate, -aminoethyl methacrylate, -acrylamide, and -methacrylamide; and also olefinically unsaturated monomers containing acryloyloxysilane groups and hydroxyl groups, preparable by reacting hydroxy-functional silanes with epichlorohydrin and then reacting the intermediate with an alpha, beta-olefinically unsaturated carboxylic acid, especially acrylic acid and methacrylic acid, or hydroxyalkyl esters thereof;

(3) vinyl esters of alpha-branched monocarboxylic acids having from 5 to 18 carbon atoms in the molecule, such as the vinyl esters of Versatic® acid, which are sold under the brand name VeoVa®;

(4) cyclic and/or acyclic olefins, such as ethylene, propylene, but-1-ene, pent-1-ene, hex-1-ene, cyclohexene, cyclopentene, norbornene, butadiene, isoprene, cyclopentadiene and/or dicyclopentadiene;

(5) amides of alpha,beta-olefinically unsaturated carboxylic acids, such as (meth)acrylamide, N-methyl-, N,N-dimethyl-, N-ethyl-, N,N-diethyl-, N-propyl-, N,N-dipropyl-, N-butyl-, N,N-dibutyl- and/or N,N-cyclohexyl-methyl-(meth)acrylamide;

(6) monomers containing epoxide groups, such as the glycidyl ester of acrylic acid, methacrylic acid, ethacrylic acid, crotonic acid, maleic acid, fumaric acid and/or itaconic acid;

(7) vinylaromatic hydrocarbons, such as styrene, vinyltoluene or alpha-alkylstyrenes, especially alpha-methylstyrene;

(8) nitriles, such as acrylonitrile or methacrylonitrile;

(9) vinyl compounds, selected from the group consisting of vinyl halides such as vinyl chloride, vinyl fluoride, vinylidene dichloride, and vinylidene difluoride; vinylamides, such as N-vinylpyrrolidone; vinyl ethers such as ethyl vinyl ether, n-propyl vinyl ether, isopropyl vinyl ether, n-butyl vinyl ether, isobutyl vinyl ether, and vinyl cyclohexyl ether; and also vinyl esters such as vinyl acetate, vinyl propionate, and vinyl butyrate;

(10) allyl compounds, selected from the group consisting of allyl ethers and allyl esters, such as propyl allyl ether, butyl allyl ether, ethylene glycol diallyl ether, and trimethylolpropane triallyl ether, and allyl acetate and allyl propionate; regarding the monomers of higher functionality, the comments made above apply analogously;

(11) monomers containing siloxane groups, such as methacryloyloxypropyltrimethoxysilane (MEMO); and

(12) polysiloxane macromonomers having a number average molecular weight Mn of from 1000 to 40,000 and containing on average from 0.5 to 2.5 ethylenically unsaturated double bonds per molecule, such as polysiloxane macromonomers having a number average molecular weight Mn of from 1000 to 40,000 ethylenically unsaturated double bonds per molecule; especially polysiloxane macromonomers having a number average molecular weight Mn of from 2000 to 20,000, with particular preference from 2500 to 10,000, and in particular from 3000 to 7000 and containing on average from 0.5 to 2.5, preferably from 0.5 to 1.5, ethylenically unsaturated double bonds per molecule, as are described in DE 38 07 571 A 1 on pages 5 to 7, in DE 37 06 095 A 1 in columns 3 to 7, in EP 0 358 153 B 1 on pages 3 to 6, in U.S. Pat. No. 4,754,014 A 1 in columns 5 to 9, in DE 44 21 823 A 1, or in the international patent application WO 92/22615 on page 12 line 18 to page 18 line 10.

As monomers (b) compounds of the general formula I are used.

In the general formula I the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl, and 2-ethylhexyl.

Examples of suitable cycloalkyl radicals are cyclobutyl, cyclopentyl, and cyclohexyl.

Examples of suitable alkylcycloalkyl radicals are methylenecyclohexane, ethylenecyclohexane, and propane-1,3-diylcyclohexane.

Examples of suitable cycloalkylalkyl radicals are 2-, 3-, and 4-methyl-, -ethyl-, -propyl-, and -butylcyclohex-1-yl.

Examples of suitable aryl radicals are phenyl, naphthyl, and biphenylyl.

Examples of suitable alkylaryl radicals are benzyl and ethylene- and propane-1,3-diylbenzyl.

Examples of suitable cycloalkylaryl radicals are 2-, 3- and 4-phenylcyclohex-1-yl.

Examples of suitable arylalkyl radicals are 2-, 3-, and 4-methyl-, -ethyl-, -propyl-, and -butylphen-1-yl.

Examples of suitable arylcycloalkyl radicals are 2-, 3- and 4-cyclohexylphen-1-yl.

The above-described radicals $R^1$, $R^2$, $R^3$, and $R^4$ may be substituted. For this purpose, electron withdrawing or electron donating atoms or organic radicals may be used.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl, and arylcycloalkyl radicals, including those exemplified above, especially tert-butyl; aryloxy, alkyloxy, and cycloalkyloxy radicals, especially phenoxy, naphthoxy, methoxy, ethoxy, propoxy, butyloxy or cyclohexyloxy; arylthio, alkylthio, and cycloalkylthio radicals, especially phenylthio, naphthylthio, methylthio, ethylthio, propylthio, butylthio, and cyclohexylthio; and/or hydroxyl groups.

Examples of monomers (b) used with particular preference in accordance with the invention are 1,1-diphenylethylene, 1,1-dinaphthaleneethylene, cis- and trans-stilbene, and vinylidenebis(4-nitrobenzene).

In accordance with the invention, the monomers (b) may be used individually or as a mixture of at least two monomers (b).

With regard to the reaction regime and the properties of the resulting copolymers (A), 1,1-diphenylethylene is of very particular advantage and is therefore used with very particular preference in accordance with the invention.

Each of the abovementioned monomers containing anionic and/or potentially anionic functional groups (a) may be polymerized on its own with the monomer (b). In accordance with the invention, however, it is of advantage to use at least one further monomer (a) that is free of these functional groups, since by this means the profile of properties of the resulting copolymers in stage (1) may, in a particularly advantageous manner, be varied very broadly and custom-tailored to the respective end use of the dispersions of the invention. The monomers (a) are preferably selected so that the profile of properties of the copolymers (A) is substantially determined by the above-described (meth)acrylate monomers (a), with the monomers (a) from other classes broadly and purposively varying this profile of properties in an advantageous manner. By this means, in particular, functional groups by means of which the copolymers (A) become hydrophilic, so that they can be dissolved or dispersed in aqueous media, can be incorporated into the block copolymers (A). It is also possible to incorporate reactive functional groups which are able to enter into thermal crosslinking reactions with the complementary reactive functional groups (S2), described below, in the compounds II described below. Moreover, it is possible to incorporate functional groups which give the copolymers (A) self-crosslinking properties, such as N-methylol or N-alkoxymethyl or N-methylol ether groups. Incorporated into the copolymers (A) not least may be at least one of the reactive functional groups (S1) described below, containing at least one bond which can be activated with actinic radiation, which are able to react with any bonds which can be activated with actinic radiation that are present in the compounds II described below. Of course, both kinds of reactive functional groups (S1) and (S2) may be incorporated into the copolymers (A). The copolymers (A) in question are in that case curable both thermally and with actinic radiation, something which is referred to by those in the art as dual cure.

Here and below, actinic radiation means electromagnetic radiation, such as near infrared (NIR), visible light, UV radiation or X-rays, especially UV radiation, and corpuscular radiation, such as electron beams.

The copolymer (A) may therefore contain at least one, preferably at least two, reactive functional groups (S2) which are able to enter into thermal crosslinking reactions with complementary reactive functional groups (S2) of the compounds II described below. These reactive functional groups may be incorporated into the copolymers (A) by way of the monomers (a), or may be introduced by means of polymer-analogous reactions following the synthesis of said copolymers. It should be ensured here that the reactive functional groups (S2) do not undergo any unwanted reactions with one another or with the aqueous medium, such as, for example, unwanted salt formation, the formation of insoluble precipitates, or premature crosslinking, all of which adversely affect the stability of the dispersion of the invention.

Examples of suitable complementary reactive functional groups (S2) for use in accordance with the invention that enter into crosslinking reactions are compiled in the overview below. In the overview, the variable $R^5$ stands for substituted or unsubstituted alkyl, cycloalkyl, alkylcycloalkyl, cycloalkylalkyl, aryl, alkylaryl, cycloalkylaryl, arylalkyl or arylcycloalkyl radicals. Examples of suitable such radicals are those recited above in connection with the radicals $R^1$, $R^2$, $R^3$, and $R^4$.

Overview: Examples of Complementary Functional Groups (S2)

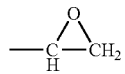

| Copolymer (A)<br>Compound II | and or<br>and | compound II<br>copolymer (A) |
|---|---|---|
| —SH<br>—OH | | —C(O)—OH<br>—C(O)—O—C(O)—<br>—NH—C(O)—OR$^5$<br>—CH$_2$—OH<br>—CH$_2$—O—CH$_3$<br>—NH—C(O)—CH(—C(O)OR$^5$)$_2$<br>—NH—C(O)—CH(—C(O)OR$^5$)(—C(O)—R$^5$)<br>>Si(OR$^5$)$_2$ |
| —C(O)—OH | | (epoxide structure) |
| —O—C(O)—CR$^5$=CH$_2$<br>—O—CR=CH$_2$ | | —OH<br>—C(O)—CH$_2$—C(O)—R$^5$<br>—CH=CH$_2$ |

The copolymers (A) are preferably prepared by reacting, in a first stage (1), at least one monomer (b) with at least one monomer (a) containing at least one potentially anionic or anionic functional group, to form a copolymer or a macroinitiator. This copolymer or this macroinitiator is then, in at least one further stage (2), following its isolation or directly in the reaction mixture, preferably directly in the reaction mixture, reacted with at least one further, preferably hydrophobic, monomer (a) containing no potentially anionic, anionic or nonionic hydrophilic groups, under free-radical conditions.

The reaction in stage (2) is preferably carried out following the addition of a small amount, or without the addition, of a free-radical polymerization initiator. Small amounts are amounts below the amounts of initiators used in stage (1) in each case. This means that reaction in stage (2) can be carried out in the complete absence of an initiator or can be carried out and initiated by the remnants of the initiator used in stage (1) or by an initiator added in the comparable amount.

Alternatively, stages (1) and (2) may also be conducted in succession in one reactor. For this purpose, first of all the monomer (b) is reacted with at least one monomer (a), completely or partly, depending on the desired application and desired properties, after which at least one further monomer (a) is added and the mixture is subjected to free-radical polymerization. In another embodiment, at least two monomers (a) are used from the start, with the monomer (b) reacting first with one of the at least two monomers (a) and then the resulting copolymer, above a certain molecular weight, also reacting with the further monomer(s) (a).

Preferably, the weight ratio of the copolymer or macroinitiator formed in the first stage (1) to the further monomer(s) (a) of the further stage(s) (2) is from 1:25 to 5:1, more preferably from 1:22 to 4:1, with particular preference from 1:18 to 3:1, with very particular preference from 1:16 to 2:1, and in particular from 1:15 to 1:1.

Depending on reaction regime it is possible to prepare copolymers (A) having block, multiblock, gradient (co)polymer, star, and branched structures, with or without functionalization on the end groups.

Examples of the free-radical polymerization initiators which may be used in the first stage (1) include the following: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; potassium, sodium or ammonium peroxodisulfate; azo dinitriles such as azobisisobutyronitrile; C—C-cleaving initiators such as benzpinacol silyl ethers; or a combination of a nonoxidizing initiator with hydrogen peroxide. Further examples of suitable initiators are described in the German patent application DE 196 28 142 A1, page 3 line 49 to page 4 line 6.

It is preferred in stage (1) to add comparatively large amounts of free-radical initiator, with the fraction of the initiator in the reaction mixture, based in each case on the overall amount of the monomers (a) and (b) and the initiator, being with particular preference from 0.5 to 50% by weight, with very particular preference from 1 to 20% by weight, and in particular from 2 to 15% by weight.

The weight ratio of initiator to monomers (b) is preferably from 4:1 to 1:4, with particular preference from 3:1 to 1:3, and in particular from 2:1 to 1:2. Further advantages result if the initiator is used in excess within the stated limits.

The two-stage or multistage free-radical copolymerization or copolymerization is preferably conducted in an aqueous medium.

The aqueous medium comprises substantially water. Said aqueous medium may contain minor amounts of dissolved solid, liquid or gaseous, low and/or high molecular mass substances, especially bases, provided these do not adversely affect, let alone inhibit, the copolymerization and/or do not lead to the emission of volatile organic compounds. In the context of the present invention, the term "minor amount" means an amount which does not destroy the aqueous nature of the aqueous medium. This aqueous medium may, however, also be water alone.

Examples of suitable bases are low molecular mass bases such as sodium hydroxide solution, potassium hydroxide solution, ammonia, diethanolamine, triethanolamine, mono-, di-, and triethylamine, and/or dimethylethanolamine, especially ammonia and/or di- and/or triethanolamine.

In accordance with the invention it is of advantage if the aqueous medium used in stage (1) forms at least the majority, especially the entirety, of the aqueous medium in which the copolymer (A) is present in dispersion following its preparation.

In accordance with the invention it is further of advantage if the aqueous medium contains the copolymer formed in stage (1) in an amount, based on the total amount of aqueous medium and copolymer, of from 0.1 to 10%, preferably from 1 to 8%, and in particular from 2 to 7% by weight.

Suitable reactors for the (co)polymerization processes are the customary and known stirred tanks, stirred tank cascades, tube reactors, loop reactors or Taylor reactors, as described for example in the patents DE 198 28 742 A 1 and EP 0 498 583 A 1 or in the article by K. Kataoka in Chemical Engineering Science, Volume 50, No. 9, 1995, pages 1409 to 1416. The free-radical copolymerization is preferably conducted in stirred tanks or Taylor reactors, the Taylor reactors being designed so that the conditions of Taylor flow are met over the entire length of the reactor, even if there is a sharp change—especially an increase—in the kinematic viscosity of the reaction medium owing to copolymerization (cf. the German patent application DE 198 28 742 A 1).

The copolymerization is advantageously conducted at temperatures above room temperature and below the lowest decomposition temperature of the respective monomers used, preference being given to the choice of temperature range from 10 to 150° C., with very particular preference from 50 to 120° C., and in particular from 55 to 110° C.

When using particularly volatile monomers (a) and/or (b), the copolymerization may also be conducted under pressure, preferably under from 1.5 to 3000 bar, more preferably from 5 to 1500 bar, and in particular from 10 to 1000 bar.

As far as the molecular weight distribution is concerned, the copolymer (A) is not subject to any restrictions whatsoever. Advantageously, however, the copolymerization is conducted so as to give a ratio Mw/Mn, measured by gel permeation chromatography using polystyrene as standard, of $\leq 4$, preferably $\leq 2$, and in particular $\leq 1.5$, and, in certain cases, even $\leq 1.3$. The molecular weights of the copolymers (A) can be controlled within wide limits through the choice of the ratio of monomer (a) to monomer (b) to free-radical initiator. In this relationship, it is the amount of monomer (b) in particular that determines the molecular weight, specifically such that, the greater the fraction of monomer (b), the lower the molecular weight obtained.

The amount of the copolymer (A) in the dispersion of the invention may vary widely and is guided by the requirements of the case in hand. Preferably, the copolymer (A) is present in the dispersion of the invention in an amount, based on the sum of the essential constituents (A), (B), and (C), of from 1 to 30% by weight.

The further essential constituent of the dispersion of the invention comprises surface-modified, cationically stabilized, inorganic nanoparticles (B) of at least one kind, particularly of one kind.

The nanoparticles to be modified are preferably selected from the group consisting of main group and transition group metals and their compounds. The main group and transition group metals are preferably selected from metals of main groups three to five, transition groups three to six and also one and two of the periodic system of the elements, and the lanthanides. Particular preference is given to using boron, aluminum, gallium, silicon, germanium, tin, arsenic, antimony, silver, zinc, titanium, zirconium, hafnium, vanadium, niobium, tantalum, molybdenum, tungsten, and cerium, especially aluminum, silicon, silver, cerium, titanium, and zirconium.

The compounds of the metals are preferably the oxides, oxide hydrates, sulfates or phosphates.

Preference is given to using silver, silicon dioxide, aluminum oxide, aluminum oxide hydrate, titanium dioxide, zirconium oxide, cerium oxide, and mixtures thereof, with particular preference silver, cerium oxide, silicon dioxide, aluminum oxide hydrate, and mixtures thereof, with very particular preference aluminum oxide hydrate, and especially boehmite.

The nanoparticles to be modified preferably have a primary particle size <50 nm, more preferably from 5 to 50 µm, in particular from 10 to 30 nm.

The nanoparticles (B) for use in accordance with the invention, or their surface, are modified with at least one compound of the general formula II:

$$[(S-)_o\text{-L-}]_m M(R)_n (H)_p \qquad (II).$$

In the general formula II the indices and variables have the following meanings:

| | |
|---|---|
| S | is a reactive functional group; |
| L | is an at least divalent organic linking group; |
| H | is a hydrolyzable monovalent group or a hydrolyzable atom; |
| M | is a divalent to hexavalent main group or transition group metal; |
| R | is a monovalent organic radical; |
| o | is an integer from 1 to 5, especially 1; |
| m + n + p | is an integer from 2 to 6, especially 3 or 4; |
| p | is an integer from 1 to 6, especially from 1 to 4; |
| m and n | are zero or an integer from 1 to 5, preferably from 1 to 3, in particular 1, especially m = 1 and n = 0. |

Said modification may be effected by physical adsorption of the compounds II onto the surface of the unmodified nanoparticles and/or by chemical reaction of the compounds II with suitable reactive functional groups on the surface of the unmodified nanoparticles. Preferably, the modification is effected by way of chemical reactions.

Examples of suitable metals M are those described above.

The reactive functional group S is preferably selected from the group consisting of (S1) reactive functional groups which contain at least one bond which can be activated with actinic radiation and (S2) reactive functional groups which undergo thermally initiated reactions with groups of their own kind ("with themselves") and/or with complementary reactive functional groups. Examples of suitable reactive functional groups (S2) are those described above, especially epoxide groups.

In the context of the present invention a bond which can be activated with actinic radiation is a bond which on exposure to actinic radiation becomes reactive and, with other activated bonds of its kind, enters into polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity they are referred to below as "double bonds".

Accordingly, the inventively preferred reactive group (S1) contains one double bond or two, three or four double bonds. Where more than one double bond is used, the double bonds may be conjugate. In accordance with the invention, however, it is an advantage if the double bonds are isolated, in particular each terminally, within the group (S1) in question. It is of particular advantage in accordance with the invention to use two double bonds, especially one double bond.

The bonds which can be activated with actinic radiation may be connected to the linking group L by way of carbon-carbon bonds or ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone or sulfoxide groups, but in particular by way of carbon-carbon bonds, carboxylate groups, and ether groups.

Particularly preferred reactive functional groups (S1) are therefore (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, but especially methacrylate groups (S1).

The variable H stands for a hydrolyzable monovalent group or for a hydrolyzable atom.

Examples of suitable hydrolyzable atoms are hydrogen atoms and halogen atoms, especially chlorine and bromine atoms.

Preferably, the hydrolyzable monovalent groups are used. Examples of suitable groups of this kind are groups of the general formula III:

—X—R    (III).

In the general formula III the variable X stands for an oxygen atom, sulfur atom and/or group >$NR^6$, in which $R^6$ denotes an alkyl group having from 1 to 4 carbon atoms, especially methyl, ethyl, propyl, and n-butyl. Preferably, X stands for an oxygen atom.

R stands for a monovalent organic radical. The monovalent radical R may be substituted or unsubstituted; preferably, it is unsubstituted. It may be aromatic, aliphatic or cycloaliphatic. A monovalent radical R is regarded as aromatic when X is connected directly to the aromatic radical. This rule is to be applied mutatis mutandis to the aliphatic and cycloaliphatic radicals. Preference is given to using linear or branched, especially linear, aliphatic radicals. Lower aliphatic radicals are preferred, especially the aliphatic radicals $R^1$ described above. Of these, the methyl groups or the ethyl groups are used with very particular preference.

The variable L stands for an at least divalent, especially divalent, organic linking group.

Examples of suitable divalent organic linking groups L are aliphatic, aromatic, cycloaliphatic, and aromatic-cycloaliphatic, and also heteroatoms-containing aliphatic, aromatic, cycloaliphatic, and aromatic-cycloaliphatic, hydrocarbon radicals, such as (1) substituted or unsubstituted, preferably unsubstituted, linear or branched, preferably linear, alkanediyl radicals having from 3 to 30, preferably from 3 to 20, and in particular 3 carbon atoms, which may also contain cyclic groups within the carbon chain, especially trimethylene, tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, pentadecane-1,15-diyl, hexadecane-1,16-diyl, heptadecane-1,17-diyl, octadecane-1,18-diyl, nonadecane-1,19-diyl or eicosane-1,20-diyl preferably tetramethylene, pentamethylene, hexamethylene, heptamethylene, octamethylene, nonane-1,9-diyl, decane-1,10-diyl, 2-heptyl-1-pentylcyclohexane-3,4-bis (non-9-yl), cyclohexane-1,2-, -1,4- or -1,3-bis(methyl), cyclohexane-1,2-, -1,4- or -1,3-bis(eth-2-yl), cyclohexane-1,3-bis(prop-3-yl) or cyclohexane-1,2-, -1,4- or -1,3-bis (but-4-yl);

(2) substituted or unsubstituted, preferably unsubstituted, linear or branched, preferably linear, oxaalkanediyl radicals having from 3 to 30, preferably from 3 to 20, and in particular from 3 to 6 carbon atoms, which may also contain cyclic groups within the carbon chain, especially oxapropane-1,4-diyl, oxabutane-1,5-diyl, oxapentane-1,5-diyl, oxahexane-1,7-diyl or 2-oxapentane-1,5-diyl;

(3) divalent polyester radicals containing repeating polyester units of the formula —(—CO—(CHR$^7$)$_r$—CH$_2$—O—)—. 
In this formula the index r is preferably from 4 to 6 and the substituent $R^7$=hydrogen, or an alkyl, cycloalkyl or alkoxy radical. No substituent contains more than 12 carbon atoms;

(4) linear polyether radicals, preferably having a number-average molecular weight of from 400 to 5000, in particular from 400 to 3000, which derive from poly(oxyethylene) glycols, poly(oxypropylene)glycols, and poly(oxybutylene)glycols;

(5) linear siloxane radicals, as are present, for example, in silicone rubbers, hydrogenated polybutadiene radicals or polyisoprene radicals, random or alternating butadiene-isoprene copolymer radicals or butadiene-isoprene graft copolymer radicals, which may also contain copolymerized styrene, and also ethylene-propylene-diene radicals;

(6) phen-1,4-, -1,3- or -1,2-ylene, naphth-1,4-, -1,3-, -1,2-, -1,5- or -2,5-ylene, propane-2,2-di(phen-4'-yl), methanedi(phen-4'-yl), biphenyl-4,4'-diyl or 2,4- or 2,6-tolylene; or (7) cycloalkanediyl radicals having from 4 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4"-diyl, especially 3,3,5-trimethylcyclohexane-1,5-diyl or dicyclohexylmethane-4,4'-diyl.

With particular preference, the linking groups L(1) and L(2) are used, with very particular preference trimethylene, tetramethylene, pentamethylene, hexamethylene, heptamethylene, octamethylene, oxapropane-1,4-diyl or 2-oxapentane-1,5-diyl, and especially trimethylene, oxapropane-1,4-diyl or 2-oxapentane-1,5-diyl.

In the general formula II the variable o stands for an integer from 1 to 5, preferably from 1 to 4, more preferably 1 to 3, and with particular preference 1 and 2. In particular, o is equal to 1.

The compounds II may also be used in complexed form, as is described, for example, in the international patent application WO 99/52964, page 8 lines 12 to 20.

The compounds II are customary and known and to a large extent are available commercially. Highly suitable compounds II are known, for example, from the international patent application WO 99/52964, page 6 line 1 to page 8 line 20, German patent application DE 197 26 829 A1, column 2 line 27 to column 3 line 38, German patent application DE 199 10 876 A1, page 2 line 35 to page 3 line 12, German patent application DE 38 28 098 A1, page 2 line 27 to page 4 line 43, or European patent application EP 0 450 625 A1, page 2 line 57 to page 5 line 32.

Viewed in terms of its method, the modification of the surface of the nanoparticles has no special features but instead takes place in accordance with the customary and known methods known, for example, from international patent application WO 99/52964, page 10 line 22 to page 11 line 17 and examples 1 to 20, page 14 line 10 to page 20 line 24, or from German patent application DE 197 26 829 A1, examples 1 to 6, column 5 line 63 to column 8 line 38. It is preferred to employ the proportions stated therein of compounds II to unmodified nanoparticles.

The amount of the surface-modified inorganic nanoparticles (B) in the dispersion of the invention may vary widely and is guided by the requirements of the case in hand. In the dispersion of the invention the nanoparticles (B) are present preferably in an amount, based on the sum of the essential constituents (A), (B), and (C), of from 60 to 98% by weight.

The further essential constituent of the dispersion of the invention is at least one amphiphile (C).

Amphiphiles, as is known, are molecules having both hydrophilic and lipophilic properties (cf. Römpp Chemie Lexikon, Georg Thieme Verlag, Stuttgart, New York, 9th Edition, 1989, Volume 1, page 176, "amphiphile").

The amphiphiles are preferably selected from the group consisting of monoalcohols, especially monoalcohols having from 3 to 6 carbon atoms in the molecule, and aliphatic polyols, especially diols having from 3 to 12 carbon atoms in the molecule.

Examples of highly suitable monoalcohols are propanol, isopropanol, n-butanol, isobutanol, sec-butanol, tert-butanol, amyl alcohol, neopentyl alcohol or n-hexanol.

Examples of suitable diols are propylene glycol, trimethylene glycol, butylene glycol, 1,5-pentanediol, 1,6-hexanediol, and the positionally isomeric diethyloctanediols, such as are known, for example, from the German patent application DE 198 09 643 A1.

Particular preference is given to using propanol, isopropanol, butanol or isobutanol.

The amount of the amphiphiles (C) in the dispersion of the invention may vary very widely and is guided by the requirements of the case in hand. In the dispersion of the invention the amphiphiles (C) are preferably present in an amount, based on the sum of the essential constituents (A), (B), and (C), of from 1 to 10% by weight.

Besides the essential constituents described above, the dispersion of the invention may further comprise other constituents customary in coating materials.

It is nevertheless a very particular advantage of the dispersion of the invention that even without crosslinking agents or additives it provides outstanding coatings and paint systems or optical moldings and self-supporting films.

The preparation of the dispersion of the invention requires no special features in terms of method but instead takes place in accordance with the customary and known methods of preparing aqueous dispersions, by mixing of the above-described constituents in suitable mixing equipment such as stirred tanks, dissolvers, Ultraturrax, inline dissolvers, mills with stirrer mechanism, or extruders.

The dispersion of the invention serves for producing the paint systems and coatings of the invention on primed or unprimed substrates. It is further suitable for all end uses which are described in international patent application WO 99/52964, page 12 line 10 to page 14 line 4, especially for producing optical moldings and self-supporting films.

Suitable substrates include all surfaces to be coated which are undamaged by curing of the coatings present thereon using heat or both heat and actinic radiation. Suitable substrates are composed, for example, of metals, plastics, wood, ceramic, stone, textile, fiber composites, leather, glass, glass fibers, glass wool, rock wool, mineral-bound and resin-bound building materials, such as plasterboard and cement slabs or roof shingles, and also composites of these materials. The surfaces of these materials may already be coated.

Accordingly, the dispersion of the invention is especially suitable for coating motor vehicle bodies and parts thereof, the interior and exterior of motor vehicles, the interior and exterior of buildings, doors, windows, and furniture, and, in industrial coating, for the coating of plastics parts, especially transparent plastics parts, small parts, coils, containers, packaging, electrical components, and white goods, and also for the coating of hollow glassware.

In the case of electrically conductive substrates it is possible to use primers, produced conventionally from electrocoat materials. Both anodic and cathodic electrocoat materials may be used for this purpose, but especially cathodics.

With the coating of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728T1) and also polymer blends thereof or the fiber-reinforced composite materials produced using these plastics.

Unfunctionalized and/or apolar substrate surfaces may be subjected prior to coating in a known manner to a pretreatment, such as with a plasma or by flaming, or may be provided with a hydroprimer.

Particular advantages are displayed by the dispersion of the invention and the coatings of the invention in automotive OEM finishing and refinish as clear and transparent, highly scratch-resistant, high-gloss, flexible, acid- and water-resistant, firmly adhering, antistonechip clearcoats as part of multicoat color and/or effect paint systems.

The multicoat paint systems of the invention may be produced in a variety of ways in accordance with the invention.

A first preferred variant of the coating process of the invention comprises the steps of (I) preparing a basecoat film by applying an aqueous basecoat material to the substrate, (II) drying the basecoat film, (III) preparing a clearcoat film by applying the dispersion of the invention to the basecoat film, and (IV) jointly curing the basecoat film and the clearcoat film of the invention to give the basecoat and the clearcoat of the invention (wet-on-wet technique).

This variant offers particular advantages in connection with the coating of plastics especially and is therefore employed with particular preference in that utility.

A second preferred variant of the coating process of the invention comprises the steps of (I) preparing a surfacer film by applying a surfacer to the substrate,
(II) curing the surfacer film to give the surfacer coat,
(III) preparing a basecoat film by applying an aqueous basecoat material to the surfacer coat,
(IV) drying the basecoat film,
(V) preparing the clearcoat film of the invention by applying the dispersion of the invention to the basecoat film, and
(VI) jointly curing the basecoat film and the clearcoat film of the invention to give the basecoat and the clearcoat of the invention (wet-on-wet technique).

A third preferred variant of the coating process of the invention comprises the steps of
(I) preparing a surfacer film by applying a surfacer to the substrate,
(II) drying the surfacer film,
(III) preparing a basecoat film by applying an aqueous basecoat material to the surfacer coat,
(IV) drying the basecoat film,
(V) preparing the clearcoat film of the invention by applying the dispersion of the invention to the basecoat film, and
(VI) jointly curing the surfacer film, the basecoat film, and the clearcoat film of the invention to give the surfacer coat, the basecoat, and the clearcoat of the invention (extended wet-on-wet technique).

A fourth preferred variant of the coating process of the invention comprises the steps of
(I) depositing an electrocoat film on the substrate,
(II) drying the electrocoat film,
(III) preparing a first basecoat film by applying a first basecoat material to the electrocoat film,
(IIIa) jointly curing the electrocoat film and the first basecoat film to give the electrocoat and the first basecoat (wet-on-wet technique),
(IV) preparing a second basecoat film by applying a second basecoat material to the first basecoat,
(V) drying the second basecoat film,
(VI) preparing the clearcoat film of the invention by applying the dispersion of the invention to the basecoat film, and
(VII) jointly curing the second basecoat film and the clearcoat film of the invention to give the second basecoat and the clearcoat of the invention (wet-on-wet technique).

The three last-mentioned variants offer particular advantages in connection in particular with the original finishing of automobile bodies and are therefore employed with very particular preference in that utility.

It is a very particular advantage of the coatings produced from the dispersion of the invention that they adhere outstandingly even to already-cured electrocoats, surfacer coats, basecoats or customary and known clearcoats, and so are outstandingly suitable for automotive refinish or for the scratchproofing of exposed areas of painted automobile bodies.

The dispersion of the invention may be applied by any customary method, such as spraying, knife coating, brushing, flowcoating, dipping, impregnating, trickling or rolling, for example. The substrate to be coated may itself be at rest, with the application equipment or unit being moved. Alternatively the substrate to be coated, especially a coil, may be moving, with the application unit being at rest relative to the substrate or being moved appropriately.

Preference is given to using spray application methods, such as compressed air spraying, airless spraying, high-speed rotation, electrostatic spray application (ESTA), alone or in conjunction with hot spray applications such as hot air spraying, for example. Application can be made at temperatures of max. 70 to 80° C., so that appropriate application viscosities are achieved without the short period of thermal loading being accompanied by any change in or damage to the dispersion of the invention, or its overspray, which may be intended for reprocessing. For instance, hot spraying may be configured in such a way that the dispersion of the invention is heated only very briefly in the spray nozzle or shortly before the spray nozzle.

The spray booth used for application may be operated, for example, with a circulation system, which may be temperature-controllable, and which is itself operated with a suitable absorption medium for the overspray, an example being the dispersion of the invention itself.

In general the electrocoat film, surfacer film, basecoat film, and clearcoat film are applied in a wet film thickness such that curing thereof gives coats having the thicknesses which are advantageous and necessary for their functions. In the case of the electrocoat this thickness is from 10 to 70 µm, preferably from 10 to 60 µm, with particular preference from 15 to 50 µm, and in particular from 15 to 45 µm; in the case of the surfacer coat it is from 10 to 150 µm, preferably from 10 to 120 µm, with particular preference from 10 to 100 µm, and in particular from 10 to 90 µm; in the case of the basecoat it is from 5 to 50 µm, preferably from 5 to 40 µm, with particular preference from 5 to 30 µm, and in particular from 10 to 25 µm; and in the case of the clearcoats of the invention it is from 10 to 100 µm, preferably from 15 to 80 µm, with particular preference from 20 to 70 µm, and in particular from 25 to 60 µm. It is, however, also possible to employ the multicoat system known from European patent application EP 0 817 614 A1, comprising an electrocoat, a first basecoat, a second basecoat, and a clearcoat of the invention, in which the total thickness of the first and second basecoat is from 15 to 40 µm and the coat thickness of the first basecoat amounts to from 20 to 50% of said total thickness.

The surfacer film, basecoat film, and clearcoat film of the invention may be cured thermally or both thermally and with actinic radiation (dual cure).

Curing may take place after a certain rest period. This period may have a duration of from 30 s to 2 h, preferably from 1 min to 1 h, and in particular from 1 min to 45 min. The rest period serves, for example, for leveling and for devolatilization of the paint films or for the evaporation of volatile constituents such as solvents. The rest period may be shorted and/or assisted by the application of elevated temperatures up to 90° C. and/or by a reduced humidity<10 g water/kg air, especially <5 g/kg air, provided this is not accompanied by any change in or damage to the coating films, such as premature complete crosslinking, for instance.

The thermal curing has no special features in terms of method but instead takes place in accordance with the customary and known methods, such as heating in a convection oven or irradiation with IR lamps. Thermal curing here may also take place in stages. Another preferred method of curing is that using near infrared (NIR radiation). Particular preference is given to a process in which the water component is removed rapidly from the wet films. Suitable processes of this kind are described, for example, by Rodger Talbert in Industrial Paint & Powder, 04/01, pages 30 to 33, "Curing in Seconds with NIR", or in Galvanotechnik, volume 90 (11), pages 3098 to 3100, "coating technology, NIR drying in seconds for liquid and powder coatings".

The thermal curing takes place advantageously at a temperature of from 50 to 200° C., with particular preference from 60 to 190° C., and in particular from 80 to 180° C. for a time of from 1 min up to 2 h, with particular preference from 2 min up to 1 h, and in particular from 3 min to 45 min.

Additionally, curing with actinic radiation is carried out using UV radiation and/or electron beams. In this case it is preferred to employ a dose of from 1000 to 3000, more preferably from 1100 to 2900, with particular preference from 1200 to 2800, with very particular preference from 1300 to 2700, and in particular from 1400 to 2600 mJ/cm². Where appropriate, this curing may be supplemented by actinic radiation from other radiation sources. In the case of electron beams it is preferred to operate under an inert gas atmosphere. This may be ensured, for example, by supplying carbon dioxide and/or nitrogen directly to the surface of the coating films. In the case of curing with UV radiation as well it is possible to operate under inert gas or in an oxygen-depleted atmosphere in order to prevent the formation of ozone.

Curing with actinic radiation is carried out using the customary and known radiation sources and optical auxiliary measures. Examples of suitable radiation sources are flash lamps from the company VISIT, high or low pressure mercury vapor lamps, which may be doped with lead in order to open up a radiation window up to 405 nm, or electron beam sources. The equipment and conditions for these curing methods are described, for example, in R. Holmes, U.V. and E.B. Curing Formulations for Printing Inks, Coatings and Paints, SITA Technology, Academic Press, London, United Kingdom, 1984. Further examples of suitable processes and equipment for curing with actinic radiation are described in German patent application DE 198 18 735 A1, column 10 lines 31 to 61.

In the case of workpieces of complex shape, such as are envisaged for automobile bodies, those regions not accessible to direct radiation (shadow regions), such as cavities, folds, and other structural undercuts, may be (partly) cured using pointwise, small-area or all-round emitters, in conjunction with an automatic movement means for the irradiation of cavities or edges.

Curing here may take place in stages, i.e., by multiple exposure to light or to actinic radiation. It may also be carried out alternatingly, i.e., by curing alternately with UV radiation and electron beams.

Where thermal curing and curing with actinic radiation are employed together, these methods may be used simultaneously or alternatingly. Where the two curing methods are used alternatingly, it is possible, for example, to begin with the thermal cure and to end with the actinic radiation cure. In other cases it may prove advantageous to begin and to end with the actinic radiation cure.

The multicoat paint systems of the invention have an outstanding profile of properties which is very well balanced in terms of mechanics, optics, corrosion resistance, and adhesion. Accordingly, the multicoat paint systems of the invention have the high optical quality and intercoat adhesion required by the market and do not give rise to any problems such as deficient condensation resistance, mudcracking or leveling defects or surface textures in the clearcoats of the invention.

In particular, the multicoat paint systems of the invention exhibit an outstanding metallic effect, an outstanding D.O.I. (distinctiveness of the reflected image), a high scratch resistance, and outstanding surface smoothness.

Accordingly, the primed or unprimed substrates of the invention that have been coated with at least one coating of the invention combine a particularly advantageous profile of performance properties with a particularly long service life, which makes them particularly valuable economically, esthetically, and technically.

EXAMPLES

Preparation Examples 1.1 and 1.2

Preparing Dispersions of the Copolymers (A.1) and (A.2) for Inventive Use

Preparation Example 1.1

1361.7 parts by weight of deionized water were charged to a reaction vessel equipped with a stirrer and three feed vessels and were heated to 75° C. Subsequently, at this temperature, three separate feed streams were metered into this initial charge in parallel and at a uniform rate. Feed stream 1 consisted of 24.4 parts by weight of acrylic acid, 44.0 parts by weight of methyl methacrylate and 3.6 parts by weight of 1,1-diphenylethylene. Feed stream 2 consisted of 23 parts by weight of a 25% strength by weight aqueous ammonia solution. Feed stream 3 consisted of a solution of 5.4 parts by weight of ammonium peroxodisulfate in 138.7 parts by weight of deionized water. Feed streams 1 to 3 were metered in over 30 minutes. After the end of the addition the reaction mixture was stirred at 75° C. for 1 h. It was subsequently heated to 90° C. At this temperature, via a feed stream 4, a monomer mixture of 260 parts by weight of n-butyl methacrylate, 208 parts by weight of styrene, 334 parts by weight of hydroxyethyl methacrylate and 234.4 parts by weight of ethylhexyl methacrylate was metered in at a uniform rate over 4 h. After the end of the addition, there followed a two-hour postpolymerization period at 90° C. The resultant dispersion for inventive use (A.1) had a solids content of 41.8% by weight.

At pH values from 2 to 7 the copolymer ((A.1) had an electrophoretic mobility <−2 (μm/s)/(V/cm). The electrophoretic mobility was determined by means of laser Doppler electrophoresis. The measuring equipment employed was a ZETASIZER® 3000 from Malvern.

Preparation Example 1.2

Preparation example 1 was repeated except that in the second stage the monomer mixture described in that example was replaced by a monomer mixture of 191.7 parts by weight of n-butyl methacrylate, 153.4 parts by weight of styrene, 93.3 parts by weight of hydroxypropyl methacrylate, 424.9 parts by weight of hydroxyethyl methacrylate and 173.1 parts by weight of ethylhexyl methacrylate. The resulting dispersion for inventive use (A.2) had a solids content of 41.7% by weight.

At pH values from 2 to 7 the copolymer ((A.2) had an electrophoretic mobility <−2 (μm/s)/(V/cm).

Preparation Examples 2.1 to 2.3

The Preparation of Boehmite Sols

Preparation Example 2.1

2.78 parts by weight of boehmite (DISPERAL® P 3 from Sasol Germany GmbH) were added to 25 parts by weight of dilute hydrochloric acid (0.1 N) and the mixture was stirred at room temperature until the boehmite had fully dissolved. The colloidal solution was then treated for 5 minutes in an ultrasound bath. The result was the homogeneous boehmite sol (2.1).

Preparation Example 2.2

Preparation example 2.1 was repeated but using 0.1 N acetic acid instead of hydrochloric acid. The result was the homogeneous boehmite sol (2.2).

Preparation Example 2.3

Preparation example 2.1 was repeated but using 0.1 N formic acid instead of hydrochloric acid. The result was the homogeneous boehmite sol (2.3).

Preparation Examples 3.1 to 3.4

Preparing dispersions of surface-modified nanoparticles (B.1) to (B.4)

Preparation Example 3.1

20.8 parts by weight of glycidyloxypropyltriethoxysilane were added to 27.78 parts by weight of the boehmite sol (2.1) from preparation example 2.1. The resultant reaction mixture was stirred at room temperature for 10 h. This gave the homogeneous, surface-modified boehmite sol (B.1).

Preparation Example 3.2

Preparation example 3.1 was repeated but using the boehmite sol (2.2) from preparation example 2.2 instead of the boehmite sol (2.1) from preparation example 2.1. This gave the surface-modified boehmite sol (B.2).

Preparation Example 3.3

Preparation example 3.1 was repeated but using the boehmite sol (2.3) from preparation example 2.3 instead of the boehmite sol (2.1) from preparation example 2.1. This gave the surface-modified boehmite sol (B.3).

Preparation Example 3.4

27.8 parts by weight of glycidyloxypropyltriethoxysilane were added to 27.78 parts by weight of an aqueous solution of cationically stabilized silica nanoparticles (LEVASIL® 200S from Bayer AG). The resultant reaction mixture was stirred at room temperature for 10 h. This gave the surface-modified silica sol (B.4).

Examples C1 to C4 (C=Comparative)

Producing the Noninventive Multicoat Paint Systems C1 to C4

The dispersions (B.1) to (B.4) from preparation examples 3.1 to 3.4 were applied pneumatically to test panels which had been coated with a cured electrocoat, surfacer coat, and basecoat (cf. example 1). The resultant clearcoat films C1 to C4 were cured at 140° C. for 22 minutes. The resultant clearcoats C1 to C4 were highly scratch resistant. However, they could not be produced in coat thicknesses>30 μm since in that case they showed stress cracks.

Steel panels with clearcoats C1 to C4 free from stress cracks were subjected to the constant condensation climate test. Partial delamination occurred after just 240 h.

Example 1

Preparing a Dispersion of the Invention and Producing the Multicoat Paint System of the Invention 4.75 parts by weight of the dispersion (A.1) from preparation example 1.1 and 5.0 parts by weight of isopropanol were added to 90.25 parts by weight of the dispersion (B.1) from preparation example 3.1. The resulting dispersion was stirred at room temperature for 6 h.

The dispersion of the invention was completely stable on storage. Thus during 30-day storage at room temperature the viscosity rose only from 0.2 to 0.4 dPas. Thereafter it was still possible to produce coatings which were always clear, transparent, free from surface defects, and highly scratch-resistant.

Immediately following its preparation, the dispersion was applied pneumatically to test panels. For that purpose it was adjusted to spray viscosity (DIN 4 flow cup: 18 s) with a conventional, polyurethane-based Theological aid, and was sieved (mesh size: 5 μm).

The test panels used were steel bodywork panels pretreated with commercial zinc phosphate solution. The steel panels were coated in succession with an electrocoat in a thickness of from 18 to 22 μm (cured at 175° C. for 15 minutes), a conventional surfacer with a thickness of from 35 to 40 μm (cured at 160° C. for 20 minutes), and a black basecoat with a thickness of from 12 to 15 μm (cured at 140° C. for 20 minutes). The dispersion of the invention was applied pneumatically using a gravity-feed cup-type gun in a plurality of cross-passes. The resultant clearcoat films were cured at 140° C. for 22 minutes and had a thickness of 35 μm.

The resultant clearcoats were free from stress cracks and other surface defects.

The clearcoats were resistant to stone chipping (multiple impact: 2 bar, two times 500 g of steel shot: rating 2 to 3), extremely firmly adhering (cross-cut test and tape tearoff test to DIN EN ISO 2409: GT0/0), flexible (König pendulum hardness: 83), and highly scratch-resistant (delta gloss according to DIN 67530: 4 units after the sand test; 0 units after the brush test; after the car wash simulation test: 4 units with ethanol cleaning, 23 units without cleaning).

For the sand test, the film surface was loaded with sand (20 g of quartz silver sand 1.5-2.0 mm). The sand was placed in a beaker (with its base cut off in a planar fashion) which was fixed firmly to the test panel. By means of a motor drive, the panel with the beaker and the sand was set in shaking movements. The movement of the loose sand caused damage to the film surface (100 double strokes in 20 s). Following sand exposure, the test area was cleaned to remove abraded material, wiped off carefully under a jet of cold water, and then dried using compressed air. The gloss was measured in accordance with DIN 67530 before and after damaging (measurement direction perpendicular to the direction of scratching).

In the case of the brush test, the test panels were stored at room temperature for at least 2 weeks before the test was carried out. The procedure followed was that described in FIG. 2 of page 28 of the article by P. Betz and A. Bartelt, Progress in Organic Coatings, 22 (1993), pages 27-37, albeit with modification in respect of the weight used (2000 g instead of the 280 g specified therein). In the test, the film surface was damaged using a mesh fabric which had been loaded with a weight. The mesh fabric and the film surface were wetted copiously with a laundry detergent solution. The test panel was moved back and forth under the mesh fabric in reciprocating movements by means of a motor drive. The test element was an eraser (4.5×2.0 cm, broad side perpendicular to the direction of scratching) wrapped with nylon mesh (No. 11, 31 μm mesh size, Tg 50° C.). The applied weight was 2000 g. Prior to each test the mesh fabric was renewed, with the running direction of the woven meshes parallel to the direction of scratching. Using a pipette, approximately 1 ml of a freshly stirred 0.25% strength Persil solution was applied in front of the eraser. The rotary speed of the motor was set so as to perform 80 double strokes in a time of 80 s. After the test, the remaining detergent liquid was rinsed off with cold tap water and the test panels were blown dry using compressed air. The gloss was measured in accordance with DIN 67530 before and after damaging (measurement direction perpendicular to the direction of scratching).

For the car wash simulation test, a laboratory washing unit from Amtec Kistler was used (cf. T. Klimmasch, T. Engbert, Technologietage, Cologne, DFO, report volume 32, pages 59 to 66, 1997).

Examples 2 and C5

Producing an Inventive Multicoat Paint System (example 2) and a Noninventive Multicoat Paint System (example C5)

The inventive dispersion of example 1 was used to produce the inventive clearcoat of example 2.

The dispersion (B.1) from preparation example 3.1 was used for producing the noninventive clearcoat of example C5.

The inventive dispersion from example 1 and the dispersion (B.1) from preparation example 3.1 were applied pneumatically in wedge form to test panels and cured (cf. the details relating to example 1). The film thicknesses were from 10 to 80 μm. While the resulting inventive clearcoat showed no stress cracks even at 80 μm, such cracks occurred in the noninventive clearcoat (C5) from a film thickness of just 30 μm.

Example 3

Preparing an Inventive Dispersion and Producing an Inventive Multicoat Paint System 4.75 parts by weight of the dispersion (A.1) from preparation example 1.1 and 5 parts by weight of n-butanol were added to 90.25 parts by weight of the dispersion (B.1) from preparation example 3.1. The resulting inventive dispersion was stirred at room temperature for 6 h and then applied to the test panels and cured as described in example 1. The inventive clearcoats (3) obtained had the same outstanding performance properties as the clearcoats of examples 1 and 2.

Example 4

Preparing an Inventive Dispersion and Producing an Inventive Multicoat Paint System Example 4 was repeated but using propanol instead of butanol. The inventive clearcoats obtained had the same outstanding performance properties as the clearcoats (1) to (3) of examples 1 to 3.

Example 5

Preparing an Inventive Dispersion and Producing an Inventive Multicoat Paint System Example 4 was repeated but using isobutanol instead of butanol. The inventive clearcoats obtained had the same outstanding performance properties as the clearcoats of examples 1 to 4.

Example 6

Preparing an Inventive Dispersion and Producing an Inventive Multicoat Paint System 13.25 parts by weight of dispersion (A.2) and preparation example 1.2 and 5 parts by weight of isopropanol were added to 81.75 parts by weight of the dispersion (B.2) from preparation example 3.2. The resulting inventive dispersion was stirred at room temperature for 6 h and then applied to the test panels and cured as described in example 1.

This gave inventive clearcoats with a thickness of 35 μm which were free from stress cracks and other surface defects. They were also extremely scratch-resistant, which was underlined by the steel wool scratch test (rating 1).

The steel wool scratch test was carried out using a hammer to DIN 1041 (weight without shaft: 800 g; shaft length: 35 cm). The test panels were stored at room temperature for 24 h prior to the test.

The flat side of the hammer was wrapped with a ply of steel wool and fastened to the upturned sides using adhesive tape with a creped backing (Tesakrepp). The hammer was placed onto the clearcoats at right angles. The weighted part of the hammer was guided over the surface of the clearcoats in a track without tipping and without additional physical force.

For each test, 10 double strokes were performed within a period of about 15 s. After every tenth individual test, the steel wool was replaced.

Following exposure, the test panels were cleaned with a soft cloth to remove residues of steel wool. The test areas were evaluated visually under artificial light and rated as follows:

| Rating | Damage |
| --- | --- |
| 1 | none |
| 2 | slight |
| 3 | moderate |
| 4 | moderate to middling |
| 5 | severe |
| 6 | very severe |

Evaluation was carried out immediately after the end of the test.

Example 7

Preparing an Inventive Dispersion and Producing an Inventive Multicoat Paint System Example 6 was repeated but using dispersion (B.3) from preparation example 3.3 instead of dispersion (B.2) from preparation example 3.2. The same outstanding results as in example 6 were obtained.

Example 8

Preparing an Inventive Dispersion and Producing an Inventive Multicoat Paint System Example 6 was repeated but using dispersion (B.4) from preparation example 3.4 instead of dispersion (B.2) from preparation example 3.2. The same outstanding results as in examples 6 and 7 were obtained.

Example 9

Producing an Inventive Color Multicoat Paint System by the Wet-On-Wet Technique

Example 1 was repeated except that prior to the application of the inventive dispersion the aqueous basecoat film was not cured but instead was dried at 100° C. for 10 minutes. Then the aqueous basecoat film and the inventive clearcoat film were cured jointly at 140° C. for 20 minutes.

The thickness of the inventive clearcoat was 35 μm. It was free from stress cracks and other surface defects. The gloss according to DIN 67530 was more than 90 units. The clearcoat was extremely scratch resistant (steel wool scratch test: rating 1).

Example 10

Preparing an Inventive Dispersion and Producing an Inventive Multicoat Paint System Preparation example 3.1 was repeated except that the alcohol formed as a result of the condensation was removed from the boehmite sol (3.1) of preparation example 3.1 by vacuum distillation at a water bath temperature of not more than 40° C.

4.75 parts by weight of the dispersion (A.1) from preparation example 1.1 and 5 parts by weight of isopropanol were added to 90.25 parts by weight of the alcohol-free boehmite sol. The resulting inventive dispersion was stirred at room temperature for 6 h. It had a volatile organic substances content of only 5% by weight. It was subsequently applied to test panels and cured as described in example 1. The resultant inventive clearcoat of the multicoat paint system had a thickness of 35 μm and was free from stress cracks and other surface defects.

Examples 11 to 14

Preparing Inventive Dispersions and Producing Inventive Multicoat Paint Systems

Examples 1 and 3 to 5 were repeated except that the dispersion (A.2) from preparation example 1.2 was used instead of the dispersion (A.1) from preparation example 1.1.

The resulting inventive dispersions of examples 11 to 14 were applied to test panels and cured as described in example 1. In the inventive clearcoats of examples 11 to 14, with a thickness of 35 μm, the same outstanding results as in examples 1 and 3 to 5 were obtained. In particular, the inventive clearcoats of examples 11 to 14 were highly scratch resistant (steel wool scratch test: rating 1).

Example 15

Preparing an Inventive Dispersion and Producing an Inventive Clearcoat on Glass 13.25 parts by weight of the dispersion (A.2) of preparation example 1.2 and 5 parts by weight of isopropanol were added to 81.75 parts by weight of the dispersion (B.1) from preparation example 3.1. The resulting inventive dispersion was stirred at room temperature for 6 h. It was then applied to degreased glass substrates using a doctor blade and was cured at 140° C. for 22 minutes. The thickness of the resulting clearcoat was 35 μm. No stress cracks or other surface defects were observed. The scratch resistance was outstanding (steel wool scratch test: rating 1).

Example 16

Preparing an Inventive Dispersion and Producing an Inventive Clearcoat on Plastic 1.0% by weight, based on the dispersion, of the leveling agent BYK® 301 from Byk Chemie was added to the inventive dispersion of example 15. The resulting dispersion was applied pneumatically to the flame-treated polycarbonate substrates (MAKROLON® from Bayer AG) and cured at 140° C. for 22 minutes.

The coated and uncoated polycarbonate substrates were subjected to the steel wool scratch test. The polycarbonate substrates coated with the inventive clearcoat showed no visible damage (rating 1), whereas the uncoated polycarbonate substrates were scratched (rating 5).

Example 17

Preparing an Inventive Dispersion and Producing an Inventive Clearcoat on Plastic Example 16 was repeated but replacing the polycarbonate substrates by flame-treated substrates of polybutylene terephthalate (PBTP). The same advantageous results as in example 16 were obtained.

What is claimed is:

1. An aqueous dispersion, comprising:
   (A) at least one swellable polymer and/or oligomer comprising at least one functional group that is at least one of an anionic functional group, a potentially anionic functional group, and/or a nonionic hydrophilic functional group;
   (B) surface-modified, cationically stabilized, inorganic nanoparticles of at least one kind; and
   (C) at least one amphiphile;
   wherein the at least one swellable polymer and/or oligomer (A) comprises a copolymer prepared by two-stage or multistage controlled free-radical copolymerization in an aqueous or an organic medium;
   wherein in a first stage, at least one olefinically unsaturated monomer (a) is copolymerized with at least one non-(a) olefinically unsaturated monomer of the general formula (I):

$$R^1R^2C=CR^3R^4 \qquad (I)$$ 

wherein $R^1$, $R^2$, $R^3$, and $R^4$ are each independently one of a hydrogen atom, an unsubstituted alkyl radical, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl radical, an unsubstituted arylalkyl radical, an unsubstituted arylcycloalkyl radical, a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl radical, a substituted arylalkyl radical, and a substituted arylcycloalkyl radical, with the proviso that at least two of $R^1$, $R^2$, $R^3$, and $R^4$ are at least one of an unsubstituted aryl radical, an unsubstituted arylalkyl radical, an unsubstituted arylcycloalkyl radical, a substituted aryl radical, a substituted arylalkyl radical, and a substituted arylcycloalkyl radical;
   wherein in a second stage, at least one further monomer (a) is (co)polymerized in the presence of a copolymer formed in the first stage, following the addition of small amounts, or without the addition, of free-radical initiators; and
   wherein the dispersion has a pH of from 2 to 7.

2. The aqueous dispersion of claim 1, wherein the aqueous dispersion has a solids content of up to 60% by weight, based on its total amount.

3. The aqueous dispersion of claim 1, comprising:
   from 1 to 30% by weight (A);
   from 60 to 98% by weight (B); and
   from 1 to 10% by weight (C);
   wherein % by weight is based on the sum (A)+(B)+(C).

4. The aqueous dispersion of claim 1, wherein the at least one swellable polymer and/or oligomer (A) comprises anionic and/or potentially anionic functional groups and has, at a pH of from 2 to 7, an electrophoretic mobility≦−0.5 (μm/s)/(V/cm).

5. The aqueous dispersion of claim 4, wherein the at least one swellable polymer and/or oligomer (A) has, at a pH of from 2 to 7, an electrophoretic mobility≦−2.0 (μm/s)/(V/cm).

6. The aqueous dispersion of claim 1 wherein the at least one monomer (a) comprises at least one anionic and/or potentially anionic functional group.

7. The aqueous dispersion of claim 1, wherein at least one monomer (a) comprises at least one nonionic hydrophilic functional group.

8. The aqueous dispersion of claim 1, wherein the at least one further monomer (a) comprises no anionic functional group, no potentially anionic functional group, and no nonionic hydrophilic functional group.

9. The aqueous dispersion of claim 1, wherein the potentially anionic functional group is selected from the group consisting of carboxylic acid groups, sulfonic acid groups, phosphonic acid groups, acidic sulfuric ester groups, and acidic phosphoric ester groups, and the anionic functional group is selected from the group consisting of carboxylate groups, sulfonate groups, phosphonate groups, sulfate ester groups, and phosphate ester groups.

10. The aqueous dispersion of claim 1, comprising the nonionic hydrophilic functional group, wherein the nonionic hydrophilic functional group is a polyethylene oxide group.

11. The aqueous dispersion of claim 1, wherein the at least one polymer comprises a copolymer prepared in an aqueous medium.

12. The aqueous dispersion of claim 11, wherein:
the controlled free-radical copolymerization is in the aqueous medium;
the at least one olefinically unsaturated monomer (a) comprises at least one functional group that is at least one of an anionic functional group, a potentially anionic functional group, and/or a nonionic hydrophilic functional group; and
the controlled free-radical copolymerization comprises subjecting the at least one further monomer (a) to block copolymerization with a copolymer formed in the first stage;
wherein the aqueous medium used in the first stage forms at least a majority of an aqueous medium in which the copolymer is present in the aqueous dispersion.

13. The aqueous dispersion of claim 1, wherein the inorganic nanoparticles (B) are selected from the group consisting of main group and transition group metals and their compounds.

14. The aqueous dispersion of claim 13, wherein the main group and transition group metals are selected from the group consisting of metals of main group three, metals of main group four, metals of main group five, metals of transition group three, metals of transition group four, metals of transition group five, metals of transition group six, metals of group one, metals of group two, and the lanthanides.

15. The aqueous dispersion of claim 14, wherein the metals are selected from the group consisting of boron, aluminum, gallium, silicon, germanium, tin, arsenic, antimony, silver, zinc, titanium, zirconium, hafnium, vanadium, niobium, tantalum, molybdenum, tungsten, and cerium.

16. The aqueous dispersion of claim 13, wherein the compounds of the metals are oxides, oxide hydrates, sulfates, or phosphates.

17. The aqueous dispersion of claim 15, wherein the metals and their compounds are selected from the group consisting of silver, silicon dioxide, aluminum oxide, aluminum oxide hydrate, titanium dioxide, zirconium oxide, and cerium oxide.

18. The aqueous dispersion of claim 1, wherein the nanoparticles (B) are modified with at least one compound of the general formula II:

$$[(S-)_o\text{-L-}]_m M(R)_n(H)_p \tag{II}$$

wherein S is a reactive functional group; L is an at least divalent organic linking group; H is a hydrolyzable monovalent group or a hydrolyzable atom; M is a divalent to hexavalent main group or transition group metal; R is a monovalent organic radical; o is an integer from 1 to 5; m+n+p is an integer from 2 to 6; p is an integer from 1 to 6; and m and n are zero or an integer from 1 to 5.

19. The aqueous dispersion of claim 18, wherein the nanoparticles (B) comprise at least one reactive functional group S selected from the group consisting of (S1) reactive functional groups which contain at least one bond which can be activated with actinic radiation and (S2) reactive functional groups which undergo reactions with groups of their own kind and/or with complementary reactive functional groups.

20. The aqueous dispersion of claim 19, wherein M is aluminum or silicon.

21. The aqueous dispersion of claim 1, wherein the at least one amphiphiles (C) is selected from the group consisting of monoalcohols and aliphatic polyols.

22. The aqueous dispersion of claim 21, wherein the monoalcohols are selected from the group consisting of monoalcohols having from 3 to 6 carbon atoms in the molecule and the aliphatic polyols are selected from the group consisting of diols having from 3 to 12 carbon atoms in the molecule.

23. A method comprising applying the aqueous dispersion of claim 1 to a substrate and forming one of a coating for a motor vehicle body or part, a coating for an interior and/or exterior of a building, a coating for a door, a coating for a window, a coating for furniture, an industrial coating, a coating for plastics parts, a coating for a coil, a coating for a container, a coating for an electrical component, a coating for white goods, or a coating for hollow glassware.

24. A method comprising applying the aqueous dispersion of claim 1 to a substrate as a molding or as a self supporting film.

25. An aqueous dispersion, comprising:
(A) at least one swellable polymer and/or oligomer containing at least one functional group that is at least one of an anionic functional group, a potentially anionic functional group, and/or a nonionic hydrophilic functional group;
(B) surface-modified, cationically stabilized, inorganic nanoparticles of at least one kind, wherein the nanoparticles are modified with at least one compound of the general formula II:

$$[(S-)_o\text{-L-}]_m M(R)_n(H)_p \tag{II}$$

wherein S is a reactive functional group; L is an at least divalent organic linking group; H is a hydrolyzable monovalent group or a hydrolyzable atom; M is a divalent to hexavalent main group or transition group metal; R is a monovalent organic radical; o is an integer from 1 to 5; m+n+p is an integer from 2 to 6; p is an integer from 1 to 6; and m and n are zero or an integer from 1 to 5; and (C) at least one amphiphile;
wherein the at least one swellable polymer and/or oligomer (A) comprises a copolymer prepared by two-stage or multistage controlled free-radical copolymerization in an aqueous or an organic medium;

wherein in a first stage, at least one olefinically unsaturated monomer (a) is copolymerized with at least one non-(a) olefinically unsaturated monomer of the general formula (I)

$$R^1R^2C=CR^3R^4 \qquad (I)$$

wherein $R^1$, $R^2$, $R^3$, and $R^4$ are each independently one of a hydrogen atom, an unsubstituted alkyl radical, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl radical, an unsubstituted arylalkyl radical, an unsubstituted arylcycloalkyl radical, a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl radical, a substituted arylalkyl radical, and a substituted arylcycloalkyl radical, with the proviso that at least two of $R^1$, $R^2$, $R^3$, and $R^4$ are at least one of an unsubstituted aryl radical, an unsubstituted arylalkyl radical, an unsubstituted arylcycloalkyl radical, a substituted aryl radical, a substituted arylalkyl radical, and a substituted arylcycloalkyl radical;

wherein in a second stage, at least one further monomer (a) is (co)polymerized in the presence of a copolymer formed in the first stage, following the addition of small amounts, or without the addition, of free-radical initiators; and wherein the dispersion has a pH of from 2 to 7.

\* \* \* \* \*